Feb. 6, 1940.                E. L. FISCHER                 2,189,547
                               FILM REEL
                      Original Filed Sept. 21, 1936

Inventor
Edwin L. Fischer

By
                                                    ATTORNEY

Patented Feb. 6, 1940

2,189,547

UNITED STATES PATENT OFFICE 2,189,547

FILM REEL

Edwin L. Fischer, Binghamton, N. Y., assignor to Radio Corporation of America, a corporation of Delaware Original application September 21, 1936, Serial No. 101,696. Divided and this application March 17, 1938, Serial No. 196,335

2 Claims. (Cl. 242—70)

This invention relates to sound film apparatus and has particular reference to apparatus for handling sound film in the form of a continuous loop. This application is a division of my copending application Serial No. 101,696, filed September 21, 1936.

As is well known, film in a continuous loop is used as a sound record bearer for phonographs, etc., wherever particular sounds may be reproduced in re-occurring cycles. One case wherein this type of film is used particularly is in duping or adding to a dialogue sound film such background sound effects as street noise, sound of sea waves, wind, etc. The film, in a continuous loop, is run over and over again through the sound reproducing or duping apparatus, thus economizing in film and its attending expenses.

Due to the fact that the looped end of a continuous film of the usual cellulose base type is easily broken when creased during the winding of the film upon the usual type of film reel, it has been the practice heretofore to store continuous loop film by suspending one end of a loop thereof on a peg or by rolling the film into a roll sufficiently loose to prevent creasing of the looped end portion thereof. Both of these methods require considerable space and necessitate great care during handling.

One object of the present invention is to facilitate storing a film in the form of a continuous loop.

Another object of the invention is to protect continuous film loops when not in use and to facilitate attachment and removal of the loops to and from a film reel.

Another object of the invention is to provide a film loop reel which facilitates the attachment and removal of a loop of sound film to and from a sound reproducer.

The manner in which these objects are accomplished will be apparent from the following specification taken in conjunction with the accompanying drawing wherein.

Figure 1:
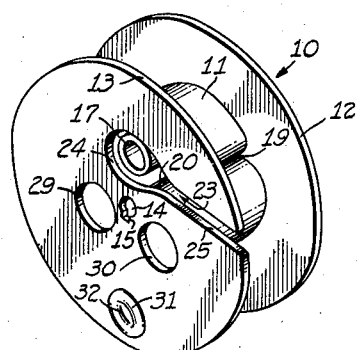
Figure 1 is a perspective view of a reel for storing a film loop according to the present invention.
Figure 2:
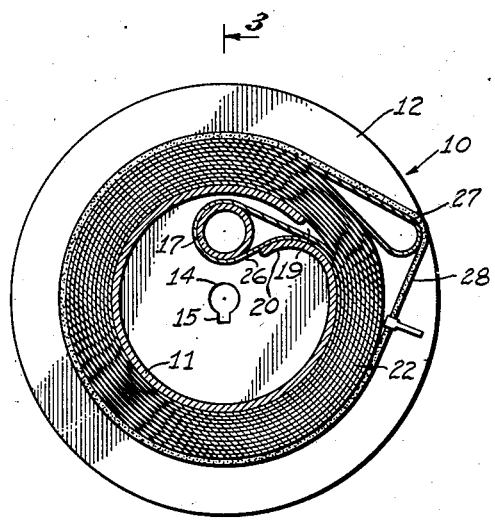
Figure 2 is a sectional view through the reel and is taken along the line 2—2 of Fig. 3.
Figure 3:
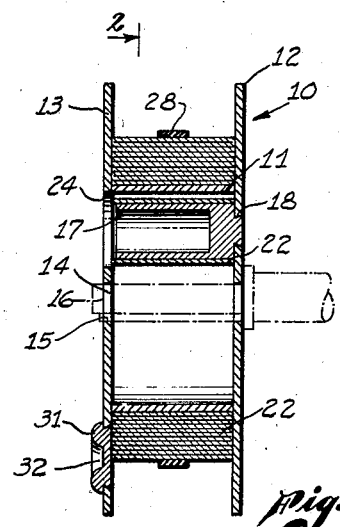
Figure 3 is a transverse sectional view of the reel and is taken along the line 3—3 of Fig. 2.

Referring to Figs. 1 to 3, inclusive, the continuous loop film reel 10 comprises an annular hub 11 around which a film in the form of a continuous loop is adapted to be wound. Flanges 12 and 13 are suitably secured on either end of hub 11 to guide the film laterally thereon. Centrally located holes 14 having keyways 15 therein permit the reel 10 to be mounted upon a keyed shaft, as shown by the dotted lines 16 of Fig. 3. A stud member 17 is secured at one end to the flange 12, as at 18, and extends parallel to the axis of the hub 11 and within the inner periphery thereof. A transverse opening or slot 19 extends the entire length of the hub 11 at a point adjacent the stud member 17. One edge 20 of the hub 11, defining one edge of the opening 19, is bent inwardly in a radius considerably less than the radius of the hub 11 to permit the looped end 26 of a continuous loop film 22 to be passed tangentially thereon from the stud member 17 while being wound upon the hub 11. The flange 13 has an opening or slot 23 therein to permit the film to be passed transversely upon the stud member 17 and into the slot 19. Opening 23 comprises an enlarged opening 24 directly opposite the free end of stud member 17 and a slot-like portion 25 communicating therewith and with the transverse opening 19 and outwardly to the periphery of flange 13.

Although the stud member 17 is shown as being preferably positioned close to the inner periphery of the hub member 11 in order to permit the portion of the film adjacent the inner looped end thereof to be passed or wound upon the hub 11 with the least amount of curvature, it is to be understood that the stud 17 may also be provided coaxially with the axis of the hub 11, or in fact, in any position within the inner periphery of hub 11.

On threading the film upon the reel 10, a looped end portion as at 26 (Fig. 2) is passed transversely through the slot 23, onto the stud member 17 and through the opening 19. The film is then wrapped tangentially upon the inwardly curved portion 20 of hub 11 and thence around the periphery of the hub 11 in the usual spiral manner. In order to hold the outer looped end portion 27 of the film from accidentally unwinding, a loose rubber band, as at 28, may be passed around the film roll. Preferably the outer end 27 is kept below the periphery of the flanges 12 and 13 to prevent accidental creasing or breaking of the film at this point. In order to permit handling of the film reel within close fitting magazines, a pair of finger holes 29 and 30 are provided on the outer flange 13 to permit the fingers of an operator to be inserted therein to handle the reel 10. A button 31 is also secured to the outer flange 13 near the periphery thereof and has a depression 32 therein in the central portion thereof to permit the thumb or fingers of the operator to be inserted therein for manual rotation of the reel if desired. This button 31 prevents the fingers of the operator from extending within the flange 13 and into the path of the film 22 as it is being manually wound or unwound from the hub 11.

As shown in my above identified copending application, the reel 10 containing the film loop 22 is placed upon the shaft 16 of a sound reproducer. The rubber band 28 is then removed and the outer end of the loop threaded through the sound reproducer. In returning the film loop to the reel 10, the film is unthreaded from the sound head and a loop formed and placed around stud 17. The finger or thumb may then be placed upon the button 31, the reel rotated, thus winding up the film, after which the rubber band 28 may be snapped in place.

By the use of such a storage reel, the film loop is protected when not in use, and the design of the reel facilitates threading and unthreading of the machine in which the film is used.

What is claimed is:

1. A film reel comprising an annular hub around which film is adapted to be wound, flanges on either end of said hub, said hub having a transversely extending slot therein, a transversely extending stud member within said hub having one end secured to the inner side of one of said flanges, the other of said flanges having an opening therethrough located in alignment with said stud member and said slot, said opening extending to the periphery of said flange.

2. A film reel for storing a film in a continuous loop which comprises a hub around which said film is adapted to be wound, said hub having a chamber therein and a transversely extending slot communicating said chamber with the periphery of said hub, flanges at the ends of said hub, a transversely extending stud member in said chamber, and having one end fixedly attached to the inner side of one of said flanges, the other end of said stud member being unsupported, and lying substantially in the plane of said other flange, said other flange having an opening therein communicating with said chamber and said slot and extending outwardly to the periphery of said flange.

EDWIN L. FISCHER.